United States Patent [19]
Aoyama et al.

[11] Patent Number: 6,011,116
[45] Date of Patent: *Jan. 4, 2000

[54] THERMOPLASTIC RESIN COMPOSITION

[75] Inventors: Taizo Aoyama, Takasago; Katsuhiko Kimura, Akashi, both of Japan

[73] Assignee: Kaneka Corporation, Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/940,008

[22] Filed: Sep. 29, 1997

Related U.S. Application Data

[63] Continuation-in-part of application No. 08/852,164, May 6, 1997, Pat. No. 5,834,563.

[30] Foreign Application Priority Data

| May 8, 1996 | [JP] | Japan | 8-113697 |
| Oct. 3, 1996 | [JP] | Japan | 8-262788 |

[51] Int. Cl.[7] .................................................. C08L 9/00
[52] U.S. Cl. ........................................ 525/86; 525/232
[58] Field of Search .......................... 525/70, 80, 191, 525/227, 241, 310, 319, 86

[56] References Cited

U.S. PATENT DOCUMENTS

| 3,458,599 | 7/1969 | Daumiller . | |
| 3,894,119 | 7/1975 | Forbes . | |
| 4,151,159 | 4/1979 | Geall | 525/227 |
| 4,154,777 | 5/1979 | Shoji et al. . | |
| 4,384,076 | 5/1983 | Ohara et al. . | |
| 4,481,330 | 11/1984 | Ohara et al. . | |
| 4,500,681 | 2/1985 | Shulman | 525/222 |
| 4,647,619 | 3/1987 | Dean . | |
| 4,894,415 | 1/1990 | Sasaki et al. . | |
| 4,946,899 | 8/1990 | Kennedy . | |
| 4,957,968 | 9/1990 | Adur | 525/75 |
| 5,013,793 | 5/1991 | Wang | 525/227 |
| 5,051,477 | 9/1991 | Yu | 525/227 |
| 5,159,018 | 10/1992 | Nishio | 525/68 |
| 5,210,148 | 5/1993 | Frechet . | |
| 5,242,983 | 9/1993 | Kennedy | 525/319 |
| 5,276,094 | 1/1994 | Kaszas . | |
| 5,395,885 | 3/1995 | Kennedy et al. . | |
| 5,401,805 | 3/1995 | Chung et al. . | |
| 5,428,111 | 6/1995 | Faust et al. . | |
| 5,458,796 | 10/1995 | Storey et al. . | |
| 5,508,038 | 4/1996 | Wang et al. . | |
| 5,548,029 | 8/1996 | Powers et al. . | |
| 5,574,105 | 11/1996 | Venkataswamy | 525/184 |

FOREIGN PATENT DOCUMENTS

| 0 332 188 | 9/1989 | European Pat. Off. . |
| 8-30102 | 3/1996 | Japan . |

OTHER PUBLICATIONS

J. P. Kennedy et al., Polymer Bulletin 13, p. 441–446 (1985).

*Primary Examiner*—Paul R. Michl
*Attorney, Agent, or Firm*—Armstrong, Westerman, Hattori, McLeland & Naughton

[57] ABSTRACT

An object of the present invention is to provide a thermoplastic resin composition exhibiting good impact resistance with maintaining excellent transparency, weather resistance and thermal stability and comprising a thermoplastic resin and at least one of a composite rubber and graft copolymer, the composite rubber comprises an isobutylene polymer and vinyl polymer which are preferably entangled with each other so as not to be separated from each other, and the graft copolymer is prepared by graft-polymerizing a vinyl monomer with the composite rubber, or comprising a thermoplastic resin and at least one of a composite rubber and graft copolymer, the composite rubber comprises an isobutylene polymer and vinyl polymer which are preferably entangled with each other so as not to be separated from each other, the isobutylene polymer has a reactive functional group on its molecular end and/or in its molecular chain and, if necessary, a moiety derived from a crosslinking agent and/or graft-linking agent, the vinyl polymer has a recurring unit derived from an acrylic acid ester and/or aromatic alkenyl compound and, if necessary, a moiety derived from the crosslinking agent and/or graft-linking agent, and the graft copolymer is prepared by graft-polymerizing a vinyl monomer with the composite rubber.

24 Claims, No Drawings

THERMOPLASTIC RESIN COMPOSITION

CROSS-REFERENCE TO RELATED APPLICATION

This is a continuation-in-part of application Ser. No. 08/852,164 filed on May 6, 1997 now U.S. Pat. No. 5,834,563.

TECHNICAL FIELD OF THE INVENTION

The present invention relates to a thermoplastic resin composition. More particularly the present invention relates to the thermoplastic resin composition which exhibits high impact resistance with maintaining, for example, excellent transparency, weather resistance and thermal stability and is usable suitably for producing molded articles such as sheet and film.

BACKGROUND ART

The impact modifiers have been used heretofore for endowing thermoplastic resins with impact resistance. As the impact modifier, there is widely known, for example, a graft copolymer which is prepared by graft-polymerizing a vinyl monomer to a butadiene rubber having a low glass transition temperature (hereinafter referred to as "Tg"). However, the thermoplastic resin having excellent thermal stability and weather resistance has not been obtained because such a graft copolymer is thermally unstable due to its unsaturated bonds.

Also as the impact modifier, there is known a graft copolymer prepared by graft-polymerizing a vinyl monomer to an acrylic rubber. Such a graft copolymer exhibits excellent improved effects in thermal stability and weather resistance, but since it has a relatively high Tg, significant effect in improvement of impact resistance cannot be obtained. Also since the acrylic rubber used as a material for the graft copolymer has a low refractive index, there is a defect that transparency of a molded article of the thermoplastic resin to which the graft copolymer has been added is impaired.

JP-A-60-252613 and JP-A-2-8209 disclose, as an impact modifier having a low Tg and being excellent in thermal stability and weather resistance, a graft copolymer prepared by graft-polymerizing a vinyl monomer to a polyorganosiloxane (silicone rubber). Though improved effect in impact resistance can be obtained to a certain extent, it is still insufficient and much higher improvement is required. Also there is a defect that a molded article of the thermoplastic resin to which such a graft copolymer has been added has poor surface gloss. Further since the polyorganosiloxane has a low refractive index, there is a defect that transparency of the thermoplastic resin molded article is impaired.

Further JP-A-64-6012 and JP-A-4-100812 disclose, as an impact modifier having excellent thermal stability and weather resistance without lowering surface gloss of a thermoplastic resin molded article, a graft copolymer prepared by graft-polymerizing a vinyl monomer to a composite rubber comprising a polyorganosiloxane (silicone rubber) component and poly(alkyl (meth)acrylate) (acrylic rubber) component. However, since the polyorganosiloxane has a low refractive index, there is also a defect that transparency of the thermoplastic resin molded article is impaired by adding the impact modifier containing such a silicone rubber.

SUMMARY OF THE INVENTION

The present inventors have made intensive studies in view of the above-mentioned problems. An object of the present invention is to provide a thermoplastic resin composition which is remarkably improved in impact resistance without substantially lowering inherently excellent weather resistance, thermal stability and the like of the thermoplastic resin. Also, according to the present invention, an impact-resistive thermoplastic resin composition having excellent transparency can be provided.

The present invention relates to

① a thermoplastic resin composition comprising a thermoplastic resin and at least one of a composite rubber and graft copolymer, said composite rubber comprises an isobutylene polymer and vinyl polymer, and said graft copolymer is prepared by graft-polymerizing a vinyl monomer with the composite rubber;

② a thermoplastic resin composition comprising a thermoplastic resin and at least one of a composite rubber and graft copolymer, said composite rubber comprises an isobutylene polymer and vinyl polymer, said isobutylene polymer has a reactive functional group at its molecular end and/or in its molecular chain, said vinyl polymer has a recurring unit derived from an acrylic acid ester and/or aromatic alkenyl compound, and said graft copolymer is prepared by graft-polymerizing a vinyl monomer with the composite rubber; and ③ a thermoplastic resin composition comprising a thermoplastic resin and at least one of a composite rubber and graft copolymer, said composite rubber comprises an isobutylene polymer and vinyl polymer, said isobutylene polymer has a reactive functional group at its molecular end and/or in its molecular chain and a moiety derived from a crosslinking agent and/or graft-linking agent, said vinyl polymer has a recurring unit derived from an acrylic acid ester and/or aromatic alkenyl compound and a moiety derived from the crosslinking agent and/or graft-linking agent, and said graft copolymer is prepared by graft-polymerizing a vinyl monomer with the composite rubber.

DETAILED DESCRIPTION OF THE INVENTION

The thermoplastic resin composition of the present invention comprises, as mentioned above, a thermoplastic resin and at least one of a composite rubber comprising an isobutylene polymer and vinyl polymer and a graft copolymer prepared by graft-polymerizing a vinyl monomer with the composite rubber.

In the present invention, the composite rubber may have a structure that the isobutylene polymer and vinyl polymer are entangled with each other so as not to be separated from each other or may have a structure that the isobutylene polymer and vinyl polymer are simply mixed or blended. Hereinafter the composite rubber includes the both structures. When designating the former composite rubber, it is called "entangled rubber", and when designating the latter composite rubber, it is called "blended rubber". Even in the entangled rubber, all of the isobutylene polymer and vinyl polymer are not necessarily entangled with each other, and existence of the blended polymers may be acceptable.

From the viewpoints of being excellent in enhancement of impact resistance and maintenance of transparency of the obtained thermoplastic resin composition, the entangled rubber is preferred.

Also in the thermoplastic resin composition of the present invention, when the isobutylene polymer and vinyl polymer are at least dispersed and coexistent in the thermoplastic resin, the effect of enhancing the impact resistance can be obtained. Therefore, concept of the blended rubber encompasses not only the case where the isobutylene polymer and vinyl polymer have been previously blended before or at the addition to the thermoplastic resin but also the case where the both polymers are added separately and, as a result, are dispersed and coexistent in the thermoplastic resin.

In the entangled rubber, the structure of the isobutylene polymer and vinyl polymer being entangled with each other so as not to be separated from each other means that a network structure is formed by chemically bonding or physically entangling those two polymers to each other, and thus the both polymers form an inseparable structure.

Also the composite rubber may be blended rubber particles of isobutylene polymer particles and vinyl polymer particles. The isobutylene polymer and vinyl polymer are usually prepared by emulsion polymerization when they are prepared individually, and are obtained in the form of particles. The blended rubber particles are obtained, for example, by mixing the isobutylene polymer particles and vinyl polymer particles and dispersing in water, or enlarging the particles through agglomeration by the use of acid, salt, high molecular agglomerating agent and the like. Also by using a crosslinking agent or graft-linking agent, the both polymer particles can be formed into the entangled rubber particles which have a structure that the both polymer particles are entangled with each other so as not to be separated.

The gel content of the composite rubber is from 20% to 100% by weight, preferably from 40 to 100% by weight, more preferably from 70% to 100% by weight.

The isobutylene polymer is a polymer which comprises the unit derived from isobutylene in an amount of not less than 50% by weight of the polymer, preferably not less than 70% by weight, particularly not less than 85% by weight and preferably has a reactive functional group at its molecular end and/or in its molecular chain. Examples of other units than the unit derived from the isobutylene constituting the isobutylene polymer are a unit derived from an initiator used when preparing the isobutylene polymer, a unit derived from a cationically polymerizable monomer which is used as occasion demands, a unit derived from the reactive functional group introduced onto its molecular end and/or into its molecular chain and the like.

Examples of the cationically polymerizable monomer are, for instance, aromatic alkenyl compounds such as styrene, α-methylstyrene and p-methylstyrene, vinyl ether, indene, vinyl carbazol and the like.

The concept of "being introduced into the molecular chain" encompasses the case of being introduced not only into the main chain but also into the side chain of the molecule and the case of being introduced as a side chain itself.

Examples of the reactive functional group which can be present on the molecular chain end(s) of the isobutylene polymer are, for instance, a functional group represented by the formula (I):

—R—X     (I)

wherein R is direct bond or a divalent hydrocarbon group having 1 to 20 carbon atoms, X is a halogen atom, vinyl, allyl, isopropenyl, acryloyl, methacryloyl, epoxy, amino, cyano, isocyano, cyanate, isocyanate, carboxyl, acid anhydride residue, hydroxyl, mercapto or a silicon-containing group represented by the formula (II):

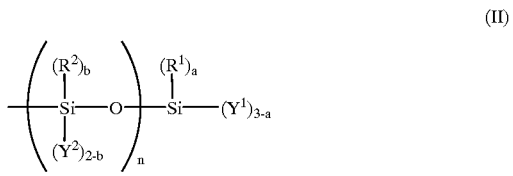

(II)

wherein $R^1$ and $R^2$ are individually a hydrocarbon group having 1 to 20 carbon atoms or a triorganosiloxy group, $Y^1$ and $Y^2$ are individually hydrogen atom, hydroxyl or a hydrolyzable group, a is 0 or an integer of 1 to 3, b is 0 or an integer of 1 to 2, n is 0 or an integer of 1 to 18; provided that $R^1$, $R^2$, $Y^1$ and $Y^2$ may be the same or different when each of them exists two or more.

Examples of the halogen atoms represented by X in the formula (I) are, for instance, chlorine atom, bromine atom and the like. Examples of the hydrolyzable group represented by $Y^1$ and $Y^2$ in the formula (II) are, for instance, alkoxyl, acyloxy, ketoximate, amino, amide, aminoxy, mercapto, alkenyloxy and the like. Among them, particularly preferred is alkoxyl from the viewpoints of moderate hydrolyzation and easy handling.

Representative examples of the isobutylene polymer having, on one end of its molecular chain, the reactive functional group represented by the formula (I), are, for instance, a low molecular weight polyisobutylene oil having an average molecular weight of about 300 to about 5000 and generally called "polybutene" such as Nisseki Polybutene HV-3000 (available from Nippon Sekiyu Kagaku Kabushiki Kaisha), Nissan Polybutene 200N (available from Nippon Yushi Kabushiki Kaisha) and Idemitsu Polybutene 300R (available from Idemitsu Sekiyu Kagaku Kabushiki Kaisha); a high molecular weight polyisobutylene having a viscosity average molecular weight of 30000 to 60000 such as "Tetolax" (available from Nippon Sekiyu Kagaku Kabushiki Kaisha); a polyisobutylene having allyl at its end(s) disclosed in JP-B-7-53768; a polyisobutylene having a silicon-containing group at its end(s) disclosed in JP-B-4-69659; and the like.

The reactive functional group which can be present in the molecular chain of the isobutylene polymer is, for example, a group having unsaturated double bond derived from a diene monomer. Representative example of the diene monomer is, for instance, isoprene. Also, the reactive functional group represented by the formula (I) may be contained in the side chain or as a side chain.

Representative examples of the isobutylene polymer which contains a group having unsaturated double bond in its chain is, for instance, a copolymer comprising a unit derived from isobutylene monomer and a unit derived from isoprene monomer and generally called "butyl rubber" such as JSR Butyl 268 (available from Japan Synthetic Rubber Co., Ltd.), KALAR5263 and KALENE800 (both available from HARDMAN INCORPORATED).

Preferred polymer used as the isobutylene polymer in the present invention are, from a point that it is common and easy to handle, one having, at its molecular end and/or in its molecular chain, at least one of reactive functional groups such as a halogen-containing group, vinyl group, allyl group, isopropenyl group, acryloyl group, methacryloyl group and silicon-containing group; from the viewpoints of wide availability and low cost, one having a reactive functional group derived from a diene monomer; and from the viewpoints of enhancing impact resistance, transparency, etc., one having allyl group or silicon-containing group as the reactive functional group. Among the isobutylene polymers, particularly preferred are a polyisobutylene having allyl group at its molecular end as the reactive functional group and a polyisobutylene having the silicon-containing group at its molecular end as the reactive functional group from the viewpoint of easiness of controlling the crosslinked structure.

The isobutylene polymer used in the present invention may comprise the isobutylene polymer, and a moiety derived from a crosslinking agent for the isobutylene polymer (hereinafter referred to as "crosslinking agent (A)") and/or a graft-linking agent for the isobutylene polymer (hereinafter referred to as "graft-linking agent (A)").

The crosslinking agent (A) functions to crosslink the isobutylene polymer, and the graft-linking agent (A) functions to produce graft-linkage of the isobutylene polymer with the vinyl polymer and/or the vinyl monomer for grafting (vinyl monomer for preparing the graft copolymer, hereinafter referred to as "vinyl monomer (2)"). In the present invention, there are a case where the crosslinking agent (A) functions to produce graft-linkage of the isobutylene polymer with the vinyl polymer and/or vinyl monomer (2), and a case where the graft-linking agent (A) functions to crosslink the isobutylene polymer.

If the reactive functional group of the isobutylene polymer is a group having unsaturated double bond such as vinyl group, since a crosslinking agent for a vinyl monomer (this vinyl monomer being hereinafter referred to as "vinyl monomer (1)" to distinguish from the vinyl monomer (2) for grafting) for preparing the vinyl polymer (hereinafter referred to as "crosslinking agent (B)"), mentioned later, and a graft-linking agent for the vinyl monomer (1) (hereinafter referred to as "graft-linking agent (B)") function as the crosslinking agent (A) and the graft-linking agent (A), respectively. Therefore, the crosslinking agent (A) and the graft-linking agent (A) may be used as occasion demands. On the other hand, there is a case where the crosslinking agent (A) and the graft-linking agent (A) function as the crosslinking agent (B) and the graft-linking agent (B), respectively.

Kinds of the crosslinking agent (A) and graft-linking agent (A) are not particularly limited, and may be properly selected, for example, depending on kind of the reactive functional group of the isobutylene polymer.

When the reactive functional group of the isobutylene polymer is the silicon-containing group, as the crosslinking agent (A), for example, trifunctional silane compounds such as trimethoxymethylsilane and triethoxyphenylsilane; tetrafunctional silane compounds such as tetramethoxysilane, tetraethoxysilane, tetrapropoxysilane and tetrabuthoxysilane; and the like can be used. As the graft-linking agent (A), there can be used, for instance, (meth)acrylic functional silane compounds such as β-methacryloyloxyethyldimethoxymethylsilane, γ-methacryloyloxypropylmethoxydimethylsilane, γ-methacryloyloxypropyldimethoxymethylsilane, γ-methacryloyloxypropyltrimethoxysilane, γ-methacryloyloxypropylethoxydiethylsilane, γ-methacryloyloxypropyldiethoxymethylsilane, γ-methacryloyloxypropyltriethoxysilane, δ-methacryloyloxybutyldiethoxymethylsilane, γ-acryloyloxypropyldimethoxymethylsilane, γ-acryloyloxypropyltrimethoxysilane; ethylenic silane compounds such as vinyltrimethoxysilane, vinyldimethoxymethylsilane, vinyltriethoxysilane, p-vinylphenyltrimethoxysilane and p-vinylphenyldimethoxymethylsilane; mercapto functional silane compounds such as γ-mercaptopropyltrimethoxysilane and γ-mercaptopropyldimethoxymethylsilane; and the like.

The crosslinking agent (A) and graft-linking agent (A) can be used alone or in a mixture of two or more. In order to sufficiently exhibit the effects obtained by using those agents, a desirable amount of the crosslinking agent (A) and/or graft-linking agent (A) is preferably not less than 0.1 part (part by weight, hereinafter the same), further preferably not less than 0.5 part based on 100 parts of the isobutylene polymer or when using the vinyl monomer (1) constituting the vinyl polymer mentioned later, of the sum of the isobutylene polymer and vinyl monomer (1). Also in order to endow the obtained composite rubber with sufficient improvement of the impact resistance and with prevention from increase in cost, it is desirable that the amount of the crosslinking agent (A) and/or graft-linking agent (A) is not more than 30 parts, preferably not more than 25 parts based on 100 parts of the sum of the isobutylene polymer and vinyl monomer (1).

The vinyl polymer which composes the above-mentioned composite rubber means, for example, a polymer which can be prepared by using the vinyl monomer (1).

Examples of the above vinyl monomer (1) are, for instance, acrylates such as methyl acrylate, ethyl acrylate, n-propyl acrylate, n-butyl acrylate, 2-ethylhexyl acrylate and n-octyl acrylate; methacrylates such as methyl methacrylate, ethyl methacrylate, n-butyl methacrylate, isobutyl methacrylate, t-butyl methacrylate, 2-ethylhexyl methacrylate, n-octyl methacrylate, cyclohexyl methacrylate and benzyl methacrylate; aromatic alkenyl compounds such as styrene, α-methylstyrene, p-methylstyrene and vinyltoluene; and cyanided vinyl compounds such as acrylonitrile and methacrylonitrile. Those are used alone or in a mixture of two or more. Among those vinyl monomers, the acrylates and aromatic alkenyl compounds, particularly n-butyl acrylate and styrene are preferable from the point that Tg and refractive index of the vinyl polymer are adjusted easily.

It is preferable that the vinyl polymer used in the present invention is, as mentioned above, a polymer obtained by polymerizing, for example, the vinyl monomer (1). The vinyl polymer may have the moiety derived from the crosslinking agent (B) and/or the graft-linking agent (B).

The crosslinking agent (B) functions to crosslink the vinyl polymer, and the graft-linking agent (B) functions to graft-link the vinyl polymer to the isobutylene polymer and/or the vinyl monomer (2). In the present invention, there are a case where the crosslinking agent (B) functions to graft-link the vinyl polymer to the isobutylene polymer and/or the vinyl monomer (2) and a case where the graft-linking agent (B) functions to crosslink the vinyl polymer.

As mentioned above, it is possible to use the crosslinking agent (A) and the graft-linking agent (A) instead of the crosslinking agent (B) and the graft-linking agent (B), respectively.

Examples of the above-mentioned crosslinking agent (B) are, for instance, ethylene glycol dimethacrylate, propylene glycol dimethacrylate, 1,3-butylene glycol dimethacrylate, 1,4-butylene glycol dimethacrylate, divinylbenzene and the like.

Examples of the above-mentioned graft-linking agent (B) are, for instance, allyl methacrylate, triallyl cyanurate, triallyl isocyanurate and the like. Allyl methacrylate can also be used as the crosslinking agent (B).

The crosslinking agent (B) and graft-linking agent (B) can be used alone or in a mixture of two or more. In order to sufficiently exhibit the effects obtained by using those agents, it is desirable that the amount of the crosslinking agent (B) and/or graft-linking agent (B) is preferably not less than 0.1 part, further preferably not less than 0.5 part based on 100 parts of the sum of the isobutylene polymer and vinyl monomer (1). Also in order to endow the obtained composite rubber with sufficient improvement of the impact resistance and with prevention from increase in cost, it is desirable that the amount of the crosslinking agent (B) and/or graft-linking agent (B) is not more than 30 parts, preferably not more than 25 parts based on 100 parts of the sum of the isobutylene polymer and vinyl monomer (1).

It is desirable that the amount of at least one of the crosslinking agent (A), graft-linking agent (A), crosslinking agent (B) and graft-linking agent (B) is adjusted to be from 0.1 to 30 parts, preferably from 0.5 to 25 parts based on 100 parts of the sum of the isobutylene polymer and vinyl monomer (1).

A process for preparing the composite rubber used in the present invention is not particularly limited. From the viewpoints that process steps are simple and that the composite rubber can be synthesized in the form of fine particles, it is preferable to adopt microsuspension polymerization process. In this case, the composite rubber can be obtained in the form of particles. For example, there can be employed a process for obtaining a composite rubber latex by dispersing and emulsifying an aqueous mixture of the isobutylene polymer, vinyl monomer (1), usual radical polymerization initiator and if necessary, the crosslinking agent (A) and/or graft-linking agent (A) and the crosslinking agent (B) and/or graft-linking agent (B) in the presence of, for example, an emulsifying agent and, if necessary, a dispersion stabilizer such as a higher alcohol with shearing in water by the use of, for example, a homogenizer, and then polymerizing. At that time in case of using, for example, polyisobutylene having the silicon-containing group at its end as the isobutylene polymer, condensation reaction of the silicon-containing group can be accelerated by acidifying the reaction system with an inorganic acid such as hydrochloric acid, sulfuric acid or nitric acid or an organic acid such as alkylbenzene sulfonate, alkyl sulfonate or alkyl sulfate which exhibits surface activating function. With advance of the polymerization, there can be obtained an entangled rubber having a structure that the isobutylene polymer and vinyl polymer are entangled with each other so as not to be separated substantially due to chemical bonding between the both polymers and/or due to formation of a network structure in which the isobutylene polymer and vinyl polymer are physically entangled. There is a case where the isobutylene polymer and vinyl polymer become in the structure of blended rubber in which the both polymers are simply mixed (coexist) as mentioned above, which depends on polymerization conditions.

The composite rubber (particles) can also be obtained by mixing the isobutylene polymer latex prepared through emulsion polymerization and the vinyl polymer latex, and then enlarging the particles through agglomeration by the use of acid, salt, high molecular agglomerating agent and the like. In this case, the obtained composite rubber is the blended rubber. By reacting the crosslinking agents (A) and (B) and/or the graft-linking agents (A) and (B) with the blended rubber enlarged through agglomeration, there can be obtained the entangled rubber having a structure that the both polymers are entangled with each other so as not to be separated.

In the present invention, a gel content of the composite rubber is a weight percentage of gel which is insoluble in toluene and measured by dipping the composite rubber in toluene at room temperature for eight hours with stirring and then centrifuging at 12,000 rpm for 60 minutes. The gel content is not less than 20% by weight, preferably not less than 40% by weight, further preferably not less than 70% by weight.

The percentages of the isobutylene polymer and vinyl polymer in the so-obtained composite rubber are not limited particularly, and may be adjusted properly depending on purposes. In order to improve the impact resistance sufficiently, it is desirable that the amount of the isobutylene polymer is adjusted to not less than 1% by weight, preferably not less than 10% by weight, namely the amount of the vinyl polymer is adjusted to not more than 99% by weight, preferably not more than 90% by weight. Also in order to adjust a refractive index to exhibit transparency sufficiently, it is desirable that the amount of the isobutylene polymer is adjusted to not more than 99% by weight, preferably not more than 90% by weight, namely the amount of the vinyl polymer is adjusted to not less than 1% by weight, preferably not less than 10% by weight, which, however, cannot be said so unconditionally and can vary depending on kind of the thermoplastic resin used.

When the composite rubber is in the form of particles, in order to obtain sufficiently improved impact resistance and give sufficient transparency, it is desirable that an average particle size of the composite rubber is from 0.05 to 10 μm, preferably from 0.05 to 5 μm.

Even in consideration of a point of forming a fine particle structure, particularly preferred composite rubber particles are those having an average particle size of 0.05 to 10 μm.

Further in the present invention, a graft copolymer obtained by graft-polymerizing the vinyl monomer (2) with the above-mentioned composite rubber can be used as an effective impact modifier for the thermoplastic resin like the above case where the composite rubber is solely used.

Examples of the vinyl monomer (2) for graft-polymerizing with the composite rubber are, for instance, acrylates such as, methyl acrylate, ethyl acrylate, n-propyl acrylate, n-butyl acrylate, 2-ethylhexyl acrylate and n-octyl acrylate; methacrylates such as methyl methacrylate, ethyl methacrylate, butyl methacrylate, 2-ethylhexyl methacrylate, cyclohexyl methacrylate and benzyl methacrylate; aromatic alkenyl compounds such as styrene, α-methylstyrene, p-methylstyrene and vinyltoluene; cyanided vinyl compounds such as acrylonitrile and methacrylonitrile; and the like. Those can be used alone or in a mixture of two or more. Among them, methyl methacrylate and styrene are preferable from the viewpoints of general availability and easy handling.

Also, as the case demands, when the vinyl monomer (2) is graft-polymerized with the composite rubber, the crosslinking agent (B) and/or graft-linking agent (B) may be used alone or in a mixture of two or more. It is preferable that the total amount of the crosslinking agent (B) and graft-linking agent (B) is from 0.01 to 20 parts based on 100 parts of the vinyl monomer (2).

The mixing amounts of the composite rubber and vinyl monomer (2) for preparing the graft copolymer are not particularly limited. In order to sufficiently improve the impact resistance, it is desirable that the graft copolymer comprises the composite rubber in an amount of not less than 30% by weight, preferably not less than 40% by weight and the vinyl monomer (2) in an amount of not more than 70% by weight, preferably not more than 60% by weight. In order to enhance dispersibility of the graft copolymer to the thermoplastic resin, it is desirable that the graft copolymer comprises the composite rubber in an amount of not more than 95% by weight, preferably not more than 90% by weight and the vinyl monomer (2) in an amount of not less than 5% by weight, preferably not less than 10% by weight.

A process for preparing the graft copolymer is not limited particularly. There can be employed a process in which the vinyl monomer (2) for grafting is added to the composite rubber latex, subjected to radical polymerization reaction in single process step or multi process steps, and the obtained graft copolymer latex is salted and precipitated to separate and recover the graft copolymer. When the polyisobutylene having the silicon-containing group at its molecular end(s) is used as the isobutylene polymer and the reaction system is made acidic, it is preferable that the composite rubber latex is neutralized by adding an aqueous solution of alkali such as sodium hydroxide, potassium hydroxide or sodium carbonate prior to the graft polymerization. This process is suitably used when the composite rubber is an entangled rubber.

When the composite rubber is the blended rubber, the graft copolymer can be prepared according to a process in which the isobutylene polymer latex and vinyl polymer latex are admixed, if occasion demands, are enlarged through particle agglomeration by the use of acid, salt or high-molecular agglomerating agent, and to the resulting composite rubber latex, the vinyl monomer (2) is added, subjected to radical polymerization reaction in single process step or multi process steps, and then the obtained graft copolymer latex is salted and precipitated to separate and recover the graft copolymer. When the polyisobutylene having the silicon-containing group at its molecular end(s) is used as the isobutylene polymer and the reaction system is made acidic, it is preferable that the composite rubber latex is neutralized by adding an aqueous solution of alkali such as sodium hydroxide, potassium hydroxide or sodium carbonate prior to the graft polymerization.

The thus obtained graft copolymer itself can be a resin having an impact resistance. Further by adding the graft copolymer to other thermoplastic resin, the thermoplastic resin can be imparted with excellent impact resistance, particularly impact resistance at low temperature. Also since it is possible, if necessary, not to substantially lower the transparency and weather resistance which are inherently possessed by various thermoplastic resins, the graft copolymer is very useful as an impact modifier as mentioned above. Further gas barrier property based on the isobutylene polymer can be expected.

When the graft copolymer is in the form of particles, in order to improve the impact resistance and transparency sufficiently, it is desirable that the average particle size of the graft copolymer is from 0.05 to 10 μm, preferably from 0.05 to 5 μm like the composite rubber particles.

Examples of the thermoplastic resin used in the present invention are, for instance, polyolefin resins such as polyethylene, polypropylene and cyclic polyolefin, poly (methyl methacrylate), poly(vinyl chloride), polycarbonate, polyester, mixture of polycarbonate and polyester, polyamide, polystyrene, poly(phenylene ether), mixture of polystyrene and poly(phenylene ether), polyacetal, polysulfone, polyphenylene sulfide, polyimide, polyether ketone and polyarylate. In addition, there may be used homopolymers or copolymers obtained by polymerizing 70 to 100% by weight of at least one of vinyl monomers of aromatic alkenyl compounds, cyanided vinyl compounds and (meth)acrylates with 30 to 0% by weight of other vinyl monomer copolymerizable with the vinyl monomer and/or a diene monomer such as butadiene or isoprene. Those can be used alone or in a mixture of two or more. In the present invention, the thermoplastic resin is not limited to them, and various thermoplastic resins can be widely used.

Among the thermoplastic resins, polymethyl methacrylate, polyvinyl chloride, polyethylene, polypropylene, cyclic polyolefin, polycarbonate and polyester are preferable from a point that any one of weather resistance, thermal stability and impact resistance is excellent. Further from a point that any one of, for example, transparency, weather resistance and impact resistance is excellent, it is preferable that the thermoplastic resin is at least one of polymethyl methacrylate, polyvinyl chloride, polyethylene, polypropylene and cyclic polyolefin.

In the thermoplastic resin composition of the present invention, the mixing amounts of at least one of the composite rubber and graft copolymer and the thermoplastic resin are not particularly limited. In order to improve the impact resistance sufficiently, it is desirable that the amount of at least one of the composite rubber and graft copolymer is adjusted to not less than 1% by weight, preferably not less than 3% by weight, namely the amount of the thermoplastic resin is adjusted to not more than 99% by weight, preferably not more than 97% by weight. Also from a point of maintaining the inherent characteristics of the thermoplastic resin, it is desirable that the amount of at least one of the composite rubber and graft copolymer is adjusted to not more than 70% by weight, preferably not more than 50% by weight, namely the amount of the thermoplastic resin is adjusted to not less than 30% by weight, preferably not less than 50% by weight.

The thermoplastic resin composition of the present invention comprises at least one of the composite rubber and graft copolymer and the thermoplastic resin. Further to the thermoplastic resin composition can be optionally added as occasion demands, additives, for example, stabilizer such as triphenyl phosphite; plasticizer such as dioctyl phthalate or dibutyl phthalate; lubricant such as polyethylene wax or polypropylene wax; phosphate flame retardant such as triphenyl phosphate or tricresyl phosphate; bromine-containing flame retardant such as decabromobiphenyl or decabromobiphenyl ether; other flame retardant such as antimony trioxide; pigment such as titanium oxide, zinc sulfide or zinc oxide; filler such as glass fiber, rock wool, asbestos, wollastonite, mica, talc or calcium carbonate; and the like.

A process for preparing the thermoplastic resin composition of the present invention is not limited particularly. For example, there can be employed a process in which the thermoplastic resin is mixed mechanically with at least one of the composite rubber and graft copolymer and the above-mentioned additive as the case demands, and the obtained mixture is formed into pellets by using, for example, Banbury mixer, roll mill and biaxial extruder. The extruded pellets can be molded in a wide temperature range. For molding, usual injection molding machine, blow molding machine, extrusion molding machine or the like can be used.

When the composite rubber or the graft copolymer is the blended rubber, the isobutylene polymer and the vinyl polymer may be added separately to the thermoplastic resin and kneaded as mentioned above.

Among the so-obtained thermoplastic resin compositions of the present invention, from excellent impact resistance and transparency, preferred are a thermoplastic resin composition comprising a thermoplastic resin and at least one of the composite rubber and graft copolymer, said composite rubber comprises the isobutylene polymer and vinyl polymer, said isobutylene polymer has a reactive functional group on its molecular end and/or in its molecular chain, said vinyl polymer has a recurring unit derived from an acrylic acid ester and/or aromatic alkenyl compound, and said graft copolymer is obtained by graft-polymerizing a vinyl monomer (2) to the composite rubber, and a thermoplastic resin composition comprising a thermoplastic resin and at least one of the composite rubber and graft copolymer, said composite rubber comprises the isobutylene polymer and vinyl polymer, said isobutylene polymer has a reactive functional group on its molecular end and/or in its molecular chain and a moiety derived from a crosslinking agent and/or graft-linking agent, said vinyl polymer has a recurring unit derived from an acrylic ester and/or aromatic alkenyl compound and a moiety derived from the crosslinking agent and/or graft-linking agent, and said graft copolymer is obtained by graft-polymerizing the vinyl monomer (2) to the composite rubber.

Though the composite rubber can have the structure of either the entangled rubber or the blended rubber, the entangled rubber is excellent in enhanced impact resistance and in transparency.

When considering improvement of physical properties such as weather resistance and impact resistance, it is preferable that the thermoplastic resin is at least one of polymethyl methacrylate, polyvinyl chloride, polypropylene, polyethylene, cyclic polyolefin, polycarbonate and polyester.

In order to obtain the thermoplastic resin composition excellent particularly in transparency, it is preferable that a refractive index of at least one of the composite rubber and graft copolymer is substantially equal to a refractive index of the thermoplastic resin, in which "substantially equal" means that the difference in the refractive index between the both is not more than 0.02, preferably not more than 0.01, further preferably not more than 0.008.

The above-mentioned refractive index of the thermoplastic resin is referred to the values mentioned in, for example, Polymer Handbook, 3rd Edition (John Wiley & Sons, 1989). When the thermoplastic resin is a copolymer, as the refractive index of the copolymer, there is employed a weighted average value (based on the weight percentage) of refractive indices of homopolymers of the monomers which constitute the copolymer.

A refractive index of the composite rubber or the graft copolymer is a value obtained by preparing a sheet-like sample and measuring its refractive index at normal temperature by using an Abbe's refractometer (3T available from Kabushiki Kaisha Atago).

When, as mentioned above, the refractive index of the thermoplastic resin is substantially equal to the refractive index of at least one of the composite rubber and graft copolymer, it is preferable that the thermoplastic resin is at least one of polymethyl methacrylate, polyvinyl chloride, polypropylene, polyethylene and cyclic polyolefin, from points that transparency can be maintained and further that physical properties such as weather resistance and impact resistance are enhanced.

Adjustment of the refractive indices between the thermoplastic resin and at least one of the composite rubber and graft copolymer can be conducted by varying a weight ratio of the isobutylene polymer to the vinyl polymer at the time when preparing the composite rubber, or changing the kind and amount of the vinyl monomer (1) used for preparing the vinyl polymer. It is particularly preferable, from the viewpoints of enhancing transparency and impact resistance and lowering cost, that the refractive index is adjusted by using an acrylic acid ester and/or aromatic alkenyl compound as the vinyl monomer (1).

For example, combination of the isobutylene polymer with the vinyl polymer obtained by polymerizing an acrylic acid ester is preferable for polymethyl methacrylate, and, for example, combination of the isobutylene polymer with the vinyl polymer obtained by polymerizing an aromatic alkenyl compound is preferable for polyvinyl chloride and cyclic polyolefin.

The thermoplastic resin composition of the present invention exhibits particularly excellent impact resistance with maintaining, for example, good transparency, weather resistance and thermal stability, etc., and therefore, can be suitably used for production of extrusion-molded or calender-molded articles such as sheet, film, plate, article having complicated profiles, etc. which are useful in the fields of packaging, building, civil engineering, automobiles, domestic electric appliances and other miscellaneous goods; articles obtained by blow molding such as bottles; injection-molded articles used for automobiles and electric appliances; and the like.

The present invention is then explained by referring to examples, but is not limited thereto.

PREPARATION EXAMPLE 1

Sixty parts of Nisseki polybutene HV-3000 (available from Nippon Sekiyu Kagaku Kabushiki Kaisha, average molecular weight: 3,700, having an isopropenyl group at its molecular end) as the isobutylene polymer, 40 parts of n-butyl acrylate as the vinyl monomer (1), 1 part of allyl methacrylate as the graft-linking agent (B) and 0.5 part of 2,2'-azobis(2,4-dimethyl valeronitrile) as the radical polymerization initiator were mixed, and the mixture was added to 200 parts of water which contained 1.4 parts of sodium lauryl sulfate. After pre-dispersing at 30,000 rpm by a homomixer, the mixture was emulsified and dispersed at a pressure of 700 kg/cm$^2$ by a homogenizer. The obtained mixture was transferred into a separable flask equipped with a condenser, nitrogen feeding tube and stirrer, followed by heating at 70° C. for five hours with stirring at 200 rpm in nitrogen stream to give a composite rubber latex. The conversion was 99%.

A part of the obtained composite rubber latex was subjected to salting out, solidifying, separating, washing and then drying at 40° C. for 15 hours to give a crumb of composite rubber ("R-1"). A gel content, content of the isobutylene polymer in the gel and refractive index of the obtained composite rubber (R-1) were determined in accordance with method mentioned below. The results and average particle size are shown in Table 1.

Then the composite rubber (R-1) latex was collected so that the solid content of the composite rubber latex would be 70 parts, and then put in a separable flask equipped with a condenser, nitrogen feeding tube, dropping funnel and stirrer. Then to the flask were added 260 parts of water, 0.001 part of ferrous sulfate, 0.004 part of disodium ethylenediaminetetraacetate and 0.1 part of sodium formaldehyde sulfoxylate. The mixture was heated to 70° C. with stirring at 200 rpm in nitrogen stream. Subsequently, 30 parts of methyl methacrylate as the vinyl monomer (2) and 0.06 part of cumene hydroperoxide as the radical polymerization initiator were put in the dropping funnel, and added dropwise to the composite rubber latex mixture over two hours, followed by stirring at 70° C. for one hour to give a graft copolymer. The conversion was 99%.

The obtained graft copolymer latex was subjected to salting out, solidifying, separating, washing and then drying at 40° C. for 15 hours to give a powder of graft copolymer (S-1). Graft efficiency and refractive index of the obtained graft copolymer (S-1) were determined in accordance with method mentioned below. The results and average particle size are shown in Table 1.

[Composite rubber]
(Gel content)

Composite rubber was immersed in toluene for eight hours with stirring at room temperature, followed by centrifuging at 12,000 rpm for 60 minutes to measure a weight percentage of the toluene-insoluble portion, which was assumed to be a gel content (% by weight).

(Isobutylene polymer content in gel)

FTIR spectrum of the gel in the composite rubber was measured with FTIR spectrometer (FTIR-8100 available from Shimadzu Corporation), and a ratio of an intensity at 1370 cm$^{-1}$ (derived from isobutylene polymer) to an intensity at 1730 cm$^{-1}$ (derived from n-butyl acrylate) was determined, and thus a weight percentage of the isobutylene polymer (content, % by weight) was calculated from the obtained ratio of intensity.

(Refractive index)

A sheet-like sample (0.5 mm thick) was prepared and its refractive index (no unit) was measured at normal temperature according to a known method with an Abbe's refractometer (3T available from Kabushiki Kaisha Atago).

[Graft copolymer]
(Graft efficiency)

Gel content of the graft copolymer was measured in the same manner as gel content of the composite rubber, and an amount increased due to the graft polymerization was determined from the gel contents of the graft copolymer and composite rubber. Then a weight percentage (×100) of the increased gel content to an amount of the vinyl monomer (2) used for the graft polymerization was calculated.

(Refractive index)

Measurement was made in the same manner as in the composite rubber.

PREPARATION EXAMPLE 2

A composite rubber (R-2) was obtained in the same manner as in Preparation Example 1 except that as the isobutylene polymer, polyisobutylene having allyl group at its end(s) (a polymer having a viscosity average molecular weight of 10,400 and prepared by the process mentioned in JP-B-7-53768) was used instead of Nisseki polybutene HV-3000. Then a graft copolymer (S-2) was prepared from the composite rubber (R-2).

A gel content, isobutylene polymer content in gel and refractive index of the composite rubber (R-2) and graft efficiency and refractive index of the graft copolymer (S-2) were evaluated in the same manner as in Preparation Example 1. The results and average particle size are shown in Table 1.

PREPARATION EXAMPLE 3

Sixty parts of polyisobutylene having the silicon-containing group at its end(s) (a polymer having an average molecular weight of 10,000 and prepared by the process mentioned in JP-B-4-69659) as the isobutylene polymer, 40 parts of n-butyl 70° C. with stirring at 200 rpm in nitrogen stream Subsequently, 30 parts of methyl methacrylate as the vinyl monomer (2) and 0.06 part of cumene hydroperoxide as the radical polymerization initiator were put in the dropping funnel, and added dropwise to the composite rubber latex mixture over two hours, followed by stirring at 70° C. for one hour to give a graft copolymer. The conversion was 99%.

The obtained graft copolymer latex was subjected to salting out, solidifying, separating, washing and then drying at 40° C. for 15 hours to give a powder of graft copolymer (S-3). Graft efficiency and refractive index of the obtained graft copolymer (S-3) were evaluated in the same manner as in Preparation Example 1. The results and average particle size are shown in Table 1.

PREPARATION EXAMPLE 4

A composite rubber (R-4) was prepared in the same manner as in Preparation Example 3 except that an amount of γ-methacryloyloxypropyltrimethoxysilane was changed from 1 part to 0.5 part and an amount of allyl methacrylate was changed from 1 part to 0.5 part, and then a graft copolymer (S-4) was prepared from the composite rubber (R-4).

A gel content, isobutylene polymer content in gel and refractive index of the composite rubber (R-4) and graft efficiency and refractive index of the graft copolymer (S-4) were evaluated in the same manner as in Preparation Example 1. The results and respective average particle size are shown in Table 1.

PREPARATION EXAMPLE 5

A composite rubber (R-5) was prepared in the same manner as in Preparation Example 4 except that an amount of the polyisobutylene having a silicon-containing group at its end was changed from 60 parts to 80 parts and an amount of n-butyl acrylate was changed from 40 parts to 20 parts. Then a graft copolymer (S-5) was prepared from the obtained composite rubber (R-5).

A gel content, isobutylene polymer content in gel and refractive index of the composite rubber (R-5) and graft efficiency and refractive index of the graft copolymer (S-5) were evaluated in the same manner as in Preparation Example 1. The results and respective average particle sizes are shown in Table 1.

PREPARATION EXAMPLE 6

Seventy parts of polyisobutylene having the silicon-containing group at its end(s) and used in Preparation Example 3 as the isobutylene polymer, 30 parts of styrene as the vinyl monomer (1), 1 part of γ-methacryloyloxypropyltrimethoxysilane as the graft-linking agent (A), 1 part of allyl methacrylate as the graft-linking agent (B) and 0.5 part of 2,2'-azobis(2,4-dimethyl valeronitrile) as the polymerization initiator were mixed, and the mixture was added to 200 parts of water which contained 1.4 parts of sodium lauryl sulfate. After pre-dispersing at 30,000 rpm by a homomixer, the mixture was emulsified and dispersed at a pressure of 700 kg/cm$^2$ by a homogenizer. The obtained mixture was transferred into a separable flask equipped with a condenser, nitrogen feeding tube and stirrer, followed by mixing with stirring at 200 rpm in nitrogen stream and then heating at 70° C. for five hours to give a composite rubber latex. The conversion was 95%.

A part of the obtained composite rubber latex was subjected to salting out, solidifying, separating, washing and then drying at 40° C. for 15 hours to give a crumb of a composite rubber (R-6). A gel content, isobutylene polymer content in gel and refractive index of the obtained composite rubber (R-6) were evaluated in the same manner as in Preparation Example 1. The results and average particle size are shown in Table 1.

The composite rubber latex was collected so that the solid content in the composite rubber (R-6) latex would be 70 parts, and then put in a separable flask equipped with a condenser, nitrogen feeding tube, dropping funnel and stirrer. Then to the flask were added 260 parts of water, 0.001 part of ferrous sulfate, 0.004 part of disodium ethylenediaminetetraacetate and 0.1 part of sodium formaldehyde sulfoxylate. The mixture was heated to 70° C. with stirring at 200 rpm in nitrogen stream. Subsequently 16.5 parts of methyl methacrylate and 13.5 parts of styrene as the vinyl monomer (2) and 0.06 part of cumene hydroperoxide as the polymerization initiator were put in the dropping funnel, and added dropwise to the composite rubber latex over two hours, followed by stirring at 70° C. for one hour to give a graft copolymer. The conversion was 98%.

The obtained graft copolymer latex was subjected to salting out, solidifying, separating, washing and then drying at 40° C. for 15 hours to give a powder of graft copolymer (S-6). Graft efficiency and refractive index of the obtained graft copolymer (S-6) were evaluated in the same manner as in Preparation Example 1. The results and average particle size are shown in Table 1.

PREPARATION EXAMPLE 7

A hundred parts of polyisobutylene having the silicon-containing group at its end(s) (polymer having an average molecular weight of 5,000 and prepared by the process mentioned in JP-B-4-69659), 1 part of γ-methacryloyloxypropyltrimethoxysilane as the graft-linking agent (A) and 40 parts of heptane were mixed, and the mixture was added to 200 parts of water which contained 1.4 parts of sodium lauryl sulfate. After pre-dispersing at 30,000 rpm by a homomixer, the mixture was emulsified and dispersed at a pressure of 700 kg/cm$^2$ by a homogenizer. The obtained mixture was transferred into a separable flask equipped with a condenser, nitrogen feeding tube and stirrer, followed by making the system acidic to pH of about 2 with hydrochloric acid with mixing and stirring at 200 rpm in nitrogen stream and then heating at 70° C. for five hours. After the reaction, the system was neutralized with an aqueous solution of sodium hydroxide. A part of the obtained rubber latex was subjected to salting out, solidifying, separating, washing and then drying at 40° C. for 15 hours to give a crumb of rubber. The gel content and isobutylene polymer content of the obtained rubber (R-7A) are shown in Table 1.

A hundred parts of n-butyl acrylate as the vinyl monomer (1), 0.5 part of allyl methacrylate and 1.0 part of 2,2'-azobis (2,4-dimethyl valeronitrile) were mixed, and the mixture was added to 200 parts of water which contained 1.4 parts of sodium lauryl sulfate and 0.7 part of higher alcohol. After pre-dispersing at 30,000 rpm by a homomixer, the mixture was emulsified and dispersed at a pressure of 700 kg/cm$^2$ by a homogenizer. The mixture was then transferred to a separable flask equipped with a condenser, nitrogen feeding tube and stirrer, followed by mixing with stirring at 200 rpm in nitrogen stream and then heating at 70° C. for five hours. The conversion was 99%. A part of the obtained rubber latex was subjected to salting out, solidifying, separating, washing and then drying at 40° C. for 15 hours to give a crumb of rubber. A gel content of the obtained rubber (R-7B) is shown in Table 1.

Then the rubbers (R-7A) and (R-7B) were mixed so that a weight ratio of solid contents thereof would be 6/4. The composite rubber latex was collected so that the solid content in the latex would be 70 parts, and then put in a separable flask equipped with a condenser, nitrogen feeding tube, dropping funnel and stirrer. Then to the flask were added 260 parts of water, 0.001 part of ferrous sulfate, 0.004 part of disodium ethylenediaminetetraacetate and 0.1 part of sodium formaldehyde sulfoxylate. The mixture was heated to 70° C. with stirring at 200 rpm in nitrogen stream. Subsequently 30 parts of methyl methacrylate as the vinyl monomer (2) and 0.06 part of cumene hydroperoxide were put in the dropping funnel and added dropwise in the rubber latex over two hours, followed by heating at 70° C. for one acrylate as the vinyl monomer (1), 1 part of γ-methacryloyloxypropyltrimethoxysilane as the graft-linking agent (A), 1 part of allyl methacrylate as the graft-linking agent (B) and 0.5 part of 2,2-azobis(2,4-dimethyl valeronitrile) as the polymerization initiator were mixed, and the mixture was added to 200 parts of water which contained 1.4 parts of sodium lauryl sulfate. After pre-dispersing at 30,000 rpm by a homomixer, the mixture was emulsified and dispersed at a pressure of 700 kg/cm$^2$ by a homogenizer. The obtained mixture was transferred into a separable flask equipped with a condenser, nitrogen feeding tube and stirrer, followed by adding a concentrated hydrochloric acid diluted to about 10 times with water with stirring at 200 rpm at room temperature in nitrogen stream, adjusting pH of the system to about 2 and stirring for 15 minutes. Then the temperature of the system was elevated to 70° C., followed by reacting for five hours with heating. After the reaction, an aqueous solution of sodium hydroxide was added to neutralize the system, and then a composite rubber latex was obtained. The conversion was 99%.

A part of the obtained composite rubber latex was subjected to salting out, solidifying, separating, washing and then drying at 40° C. for 15 hours to give a crumb of composite rubber ("R-3"). A gel content, content of the isobutylene polymer in the gel and refractive index of the obtained composite rubber (R-3) were evaluated in accordance with method mentioned below. The results and average particle size are shown in Table 1.

Then the composite rubber (R-3) latex was collected so that the solid content of the composite rubber latex would be 70 parts, and then put in a separable flask equipped with a condenser, nitrogen feeding tube, dropping funnel and stirrer. Then to the flask were added 260 parts of water, 0.001 part of ferrous sulfate, 0.004 part of disodium ethylenediaminetetraacetate and 0.1 part of sodium formaldehyde sulfoxylate. The mixture was heated to hour. The conversion was 99%. The obtained graft copolymer latex was subjected to salting out, solidifying, separating, washing and then drying at 40° C. for 15 hours to give a powder of the graft copolymer. Graft efficiency and average particle size of the obtained graft copolymer (S-7) are shown in Table 1.

Abbreviations in Table 1 indicate the followings.
HV-3000: Nisseki Polybutene HV-3000
AL-PIB: Polyisobutylene having allyl group at its end(s)
Si-PIB: Polyisobutylene having the silicon-containing group at its end(s)
BA: n-Butyl acrylate
St: Styrene
TSMA: γ-Methacryloyloxypropyltrimethoxysilane
ALMA: Allyl methacrylate
MMA: Methyl methacrylate

TABLE 1

| | Composite rubber | | | | | | | | |
| --- | --- | --- | --- | --- | --- | --- | --- | --- | --- |
| | Component (part) | | | | Characteristics | | | | |
| | | | | | | Content of | | Average | |
| Prep. Ex. No. | Isobutylene polymer | Vinyl monomer (1) | Graft-linking agent (A) | Graft-linking agent (B) | Gel content (% by weight) | isobutylene polymer (% by weight) | Refractive index (-) | particle size (μm) | Abbreviation |
| 1 | HV-3000 (60) | BA (40) | — | ALMA (1) | 40 | 50 | 1.492 | 0.18 | R-1 |
| 2 | AL-PIB (60) | BA (40) | — | ALMA (1) | 50 | 60 | 1.492 | 0.35 | R-2 |
| 3 | Si-PIB (60) | BA (40) | TSMA (1) | ALMA (1) | 85 | 60 | 1.492 | 0.35 | R-3 |
| 4 | Si-PIB (60) | BA (40) | TSMA (0.5) | ALMA (0.5) | 85 | 60 | 1.492 | 0.35 | R-4 |
| 5 | Si-PIB (80) | BA (20) | TSMA (0.5) | ALMA (0.5) | 85 | 80 | 1.500 | 0.53 | R-5 |
| 6 | Si-PIB (70) | St (30) | TSMA (1) | ALMA (1) | 90 | 70 | 1.533 | 0.44 | R-6 |

TABLE 1-continued

| 7 | Si-PIB (100) — | — BA (100) | TSMA (1) — | — ALMA (0.5) | 85 95 | 100 0 | 1.508 1.466 | 0.30 0.25 | R-7A R-7B |

| | Graft copolymer | | | | |
|---|---|---|---|---|---|
| | Component (part) | | Characteristics | | |
| Prep. Ex. No. | Composite rubber (solid content) | Vinyl monomer (2) | Graft efficiency (% by weight) | Refractive index (−) | Average particle size (μm) | Abbreviation |
|---|---|---|---|---|---|---|
| 1 | R-1 (70) | MMA (30) | 70 | 1.492 | 0.2 | S-1 |
| 2 | R-2 (70) | MMA (30) | 80 | 1.492 | 0.4 | S-2 |
| 3 | R-3 (70) | MMA (30) | 99 | 1.492 | 0.4 | S-3 |
| 4 | R-4 (70) | MMA (30) | 99 | 1.492 | 0.4 | S-4 |
| 5 | R-5 (70) | MMA (30) | 99 | 1.497 | 0.6 | S-5 |
| 6 | R-6 (70) | MMA (16.5) St (13.5) | 99 | 1.533 | 0.5 | S-6 |
| 7 | R-7A (42) R-7B (28) | MMA (30) | 90 | — | 0.35 | S-7 |

EXAMPLE 1

Sixteen parts of the graft copolymer (S-1) was mixed to 84 parts of a methacrylic resin (Parapet G1000 available from Kabushiki Kaisha Kuraray, refractive index: 1.492, hereinafter referred to as "PMMA") as the thermoplastic resin. The mixture was then extruded and kneaded at a temperature of 230° C. with a biaxial extruder with a vent (32 mm, L/D=25.5) to give pellets.

The obtained pellets were dried at 80° C. for 15 hours and then subjected to injection molding at a temperature of 230° C. to give a sample plate of 3 mm thick×120 mm×120 mm for evaluation of physical properties.

The haze and Gardener impact strength of the obtained sample plate were evaluated in the manner mentioned below. The results are shown in Table 2.
(Haze)

Haze (%) as an index for transparency was measured according to ASTM D1003.
(Gardener impact strength)

Gardener impact strength (kg·cm) as an index for impact resistance was measured at 23° C. or 0° C. according to ASTM D3029-GB.

EXAMPLES 2 TO 8

Pellets were obtained in the same manner as in Example 1 except that an amount of PMMA and kind and amount of the graft copolymer were changed as shown in Table 1, and a sample plate was produced from the obtained pellets.

Haze and Gardener impact strength of the obtained sample were measured in the same manner as in Example 1. The results are shown in Table 2.

COMPARATIVE EXAMPLE 1

Pellets were obtained in the same manner as in Example 1 except that 16 parts of an acrylic impact modifier KANE ACE FM-21 (available from Kaneka Corporation, refractive index: 1.446, hereinafter referred to as "FM-21") was used instead of 16 parts of the graft copolymer (S-1), and then a sample plate was produced from the obtained pellets.

Haze and Gardener impact strength of the obtained sample were measured in the same manner as in Example 1. The results are shown in Table 2.

COMPARATIVE EXAMPLE 2

Pellets were obtained in the same manner as in Example 8 except that 9 parts of FM-21 was used instead of 9 parts of the graft copolymer (S-4), and then a sample plate was produced from the obtained pellets.

Haze and Gardener impact strength of the obtained sample were measured in the same manner as in Example 1. The results are shown in Table 2.

COMPARATIVE EXAMPLE 3

Pellets were obtained in the same manner as in Example 1 except that the graft copolymer (S-1) was not used and that an amount of PMMA was changed from 84 parts to 100 parts, and then a sample plate was produced from the obtained pellets.

Haze and Gardener impact strength of the obtained sample were measured in the same manner as in Example 1. The results are shown in Table 2.

TABLE 2

| Ex. No. | Components of thermoplastic resin composition (part) | | | Physical properties of sample | | |
|---|---|---|---|---|---|---|
| | Thermoplastic resin (PMMA) | Graft copolymer | Impact modifier (FM-21) | Haze (%) | Gardener impact strength (kg · cm) 23° C. | 0° C. |
| 1 | 84 | S-1 (16) | — | 20 | 32 | 24 |
| 2 | 60 | S-1 (40) | — | 30 | 70 | 50 |
| 3 | 84 | S-2 (16) | — | 16 | 33 | 25 |
| 4 | 60 | S-2 (40) | — | 24 | 71 | 51 |
| 5 | 84 | S-3 (16) | — | 8 | 35 | 28 |
| 6 | 60 | S-3 (40) | — | 12 | 75 | 55 |
| 7 | 84 | S-4 (16) | — | 8 | 37 | 30 |
| 8 | 91 | S-4 (9) | — | 4 | 23 | 16 |
| Com. | | | | | | |
| 1 | 84 | — | 16 | (opaque) | 22 | 10 |
| 2 | 91 | — | 9 | (opaque) | 12 | 6 |
| 3 | 100 | — | — | 0.8 | <5 | <5 |

From the results in Table 2, it can be shown that the samples obtained from the thermoplastic resin compositions of the present invention in Examples 1 to 8 are excellent in transparency and have large Gardener impact strengths and excellent impact resistances. Also it can be shown that as compared with the samples of Comparative Examples 1 to 3, the samples of Examples 1 to 8 have large Gardener impact strengths particularly at a low temperature (0° C.).

EXAMPLE 9

Ten parts of the graft copolymer (S-4) was admixed to a mixture of 100 parts of a vinyl chloride resin (S1008 available from Kaneka Corporation, refractive index: 1.540, hereinafter referred to as "PVC") as the thermoplastic resin, 3 parts of dibutyltinmaleate and 0.5 part of stearic acid. The obtained mixture was then kneaded at 180° C. for eight minutes with rolls, and then subjected to heat press at 190° C. to give a 3 mm thick sheet.

The haze of the obtained sheet was measured in the same manner as in Example 1, and Izod impact strength and weather resistance were measured in the manner mentioned below. The results are shown in Table 3.

(Izod impact strength)

Izod impact strength (kg·cm/cm$^2$) as an index for impact resistance was measured by using a sample (sheet) with a V-shaped notch at 23° C. according to ASTM D-256-56.

(Weather resistance)

After exposing the sheet in a sunshine weather-Ometer (available from Suga Shikenki Kabushiki Kaisha, 63° C., rain) for 500 hours and 1,000 hours, Izod impact strength (notch (kg·cm/cm$^2$)) was measured in the same manner as above.

EXAMPLES 10 TO 11

A sheet was produced in the same manner as in Example 9 except that instead of 10 parts of the graft copolymer (S-4), there were used 10 parts of the graft copolymer (S-5) (Example 10), and 10 parts of the graft copolymer (S-7) (Example 11), respectively.

The haze, Izod impact strength and weather resistance of the obtained sheet were evaluated in the same manner as in Example 9. The results are shown in Table 3.

COMPARATIVE EXAMPLE 4

A sheet was obtained in the same manner as in Example 9 except that 10 parts of FM-21 was used instead of 10 parts of the graft copolymer (S-4).

The haze, Izod impact strength and weather resistance of the obtained sheet were evaluated in the same manner as in Example 9. The results are shown in Table 3.

TABLE 3

| Ex. No. | Components of thermoplastic resin composition (part) | | | Physical properties of sheet | | Weather resistance (Izod impact strength kg · cm/cm$^2$) | |
|---|---|---|---|---|---|---|---|
| | Thermoplastic resin (PVC) | Graft copolymer | Impact modifier (FM-21) | Haze (%) | Izod impact strength (kg · cm/cm$^2$) | 500 hours | 1000 hours |
| 9 | 100 | S-4 (10) | — | 50 | 100 | 80 | 55 |
| 10 | 100 | S-5 (10) | — | 40 | 120 | 95 | 70 |
| 11 | 100 | S-7 (10) | — | 60 | 80 | 60 | 40 |
| Com. 4 | 100 | — | 10 | 65 | 35 | 20 | 10 |

From the results in Table 3, it can be shown that as compared with the sheet obtained in Comparative Example 4 by using a conventional impact modifier, the sheets obtained from the thermoplastic resin compositions of the present invention in Examples 9 to 11 have significantly high Izod impact strengths and are very excellent in impact resistance, and further have high Izod impact strengths and excellent weather resistances even after a lapse of 500 hours and 1,000 hours.

EXAMPLES 12 AND 13

Ten parts (Example 12) and 15 parts (Example 13) of the graft copolymer (S-6) were admixed respectively to a mixture of 100 parts of PVC, 3 parts of dibutyltinmaleate and 0.5 part of stearic acid. The obtained mixture was then mixed at a temperature of 180° C. for eight minutes with rolls, and then subjected to heat press at 190° C. to give a 3 mm thick sheet.

The haze, Izod impact strength and weather resistance of the obtained sheet were measured in the same manner as in Example 6. The results are shown in Table 4.

COMPARATIVE EXAMPLES 5 AND 6

A sheet was produced in the same manner as in Example 12 except that instead of 10 parts of the graft copolymer (S-6), 10 parts each of W-300 (available from Mitsubishi Rayon Kabushiki Kaisha, refractive index: 1.54, hereinafter referred to as "W-300") (Comparative Example 5) or HIA-80 (available from Kureha Kagaku Kogyo Kabushiki Kaisha, refractive index: 1.54, hereinafter referred to as "HIA-80") (Comparative Example 6), both of which are a transparent acrylic impact modifier for a vinyl chloride type resin, were used, respectively.

Haze, Izod impact strength and weather resistance of the obtained sheet were measured in the same manner as in Example 6. The results are shown in Table 4.

COMPARATIVE EXAMPLE 7

A sheet was produced in the same manner as in Example 12 except that the graft copolymer (S-6) was not used.

Haze, Izod impact strength and weather resistance of the obtained sheet were measured in the same manner as in Example 9. The results are shown in Table 4.

present invention in Examples 12 and 13 are low in haze and excellent in transparency. Particularly as compared with the sheets obtained in Comparative Examples 5 and 6 by using a conventional impact modifier and the sheet of Comparative Example 7 consisting of a thermoplastic resin, the sheets of Examples 12 and 13 have significantly high Izod impact strengths and very excellent impact resistances, and further have high Izod impact strengths and excellent weather resistances even after a lapse of 500 hours and 1,000 hours.

EXAMPLE 14

Ten parts of the composite rubber (R-5) was added to 100 parts of a polypropylene resin (Noblen D501 available from Sumitomo Kagaku Kogyo Kabushiki Kaisha, refractive index: 1.503, hereinafter referred to as "PP") as the thermoplastic resin. The mixture was then extruded and kneaded at a temperature of 200° C. with a biaxial extruder with a vent (32 mm, L/D=25.5) to give pellets.

The obtained pellets were dried at 80° C. for 15 hours and then subjected to injection molding at a temperature of 230° C. to give sample plates of 1 mm thick×120 mm×120 mm and 3 mm thick×120 mm×120 mm for evaluation of physical properties.

The haze of the obtained 1 mm thick sample plate and Izod impact strength of the obtained 3 mm thick sample plate were evaluated in the same manner as in Example 9. The results are shown in Table 5.

COMPARATIVE EXAMPLE 8

Pellets were produced in the same manner as in Example 14 except that instead of 10 parts of the composite rubber (R-5), 10 parts of ethylene-propylene copolymer rubber (Toughmer P0680 available from Mitsui Sekiyu Kagaku Kogyo Kabushiki Kaisha, refractive index: 1.48, hereinafter referred to as "EPR") was used, and then a sample plate was produced from the obtained pellets.

Haze and Izod impact strength of the obtained sample plate were measured in the same manner as in Example 14. The results are shown in Table 5.

COMPARATIVE EXAMPLE 9

Pellets were prepared in the same manner as in Example 14 except that the composite rubber (R-5) was not used, and then a sample plate was produced from the obtained pellets.

TABLE 4

| | Components of thermoplastic resin composition (part) | | | Physical properties of sheet | | | |
| --- | --- | --- | --- | --- | --- | --- | --- |
| | | | | | | Weather resistance (Izod impact strength kg · cm/cm$^2$) | |
| Ex. No. | Thermoplastic resin (PVC) | Graft copolymer (S-6) | Impact modifier | Haze (%) | Izod impact strength (kg · cm/cm$^2$) | 500 hours | 1000 hours |
| 12 | 100 | 10 | — | 8 | 50 | 30 | 20 |
| 13 | 100 | 15 | — | 12 | 80 | 50 | 30 |
| Com. | | | | | | | |
| 5 | 100 | — | W-300 (10) | 10 | 16 | 8 | 3 |
| 6 | 100 | — | HIA-80 (10) | 11 | 15 | 7 | 3 |
| 7 | 100 | — | — | 7 | 5 | 3 | 2 |

From the results in Table 4, it can be shown that the sheets obtained from the thermoplastic resin compositions of the Haze and Izod impact strength of the obtained sample plate were measured in the same manner as in Example 14.

The results are shown in Table 5.

TABLE 5

| Ex. No. | Components of thermoplastic resin composition (part) | | | Physical properties of sample | |
|---|---|---|---|---|---|
| | Thermoplastic resin (PP) | Composite rubber (R-5) | Impact modifier (EPR) | Haze (%) | Izod impact strength (kg · cm/cm²) |
| 14 | 100 | 10 | — | 60 | 25 |
| Com. | | | | | |
| 8 | 100 | — | 10 | (opaque) | 20 |
| 9 | 100 | — | — | 75 | 5 |

From the results in Table 5, it can be shown that the sample obtained in Example 14 from the thermoplastic resin composition of the present invention is excellent in transparency and impact resistance and has high Izod impact strength.

EXAMPLES 15 AND 16

Twenty parts of the composite rubber (R-6) was added to 100 parts of a cyclic polyolefin (Apel 6013 available from Mitsui Sekiyu Kagaku Kogyo Kabushiki Kaisha, refractive index: 1.534, hereinafter referred to as "COC") as the thermoplastic resin. The mixture was then extruded and kneaded at a temperature of 260° C. with a biaxial extruder with a vent (32 mm, L/D=25.5) to give pellets.

The obtained pellets were dried at 80° C. for 15 hours and then subjected to injection molding at a temperature of 260° C. to give sample plates of 1 mm thick×120 mm×120 mm and 3 mm thick×120 mm×120 mm for evaluation of physical properties.

Also, sample plates were produced in the same manner as mentioned above except that 30 parts of the composite rubber (R-6) was added to 100 parts of COC.

The haze of the obtained 1 mm thick sample plate and Izod impact strength of the obtained 3 mm thick sample plate were evaluated in the same manner as in Example 14. The results are shown in Table 6.

COMPARATIVE EXAMPLE 10

Pellets were obtained in the same manner as in Example 15 except that 20 parts of EPR was used instead of 20 parts of the composite rubber (R-6), and then a sample plate was produced from the obtained pellets.

Haze and Izod impact strength of the obtained sample plate were measured in the same manner as in Example 14. The results are shown in Table 6.

COMPARATIVE EXAMPLE 11

Pellets were obtained in the same manner as in Example 15 except that the composite rubber (R-6) was not used, and then a sample plate was produced from the obtained pellets.

Haze and Izod impact strength of the obtained sample plate were measured in the same manner as in Example 14. The results are shown in Table 6.

TABLE 6

| Ex. No. | Components of thermoplastic resin composition (part) | | | Physical properties of sample | |
|---|---|---|---|---|---|
| | Thermoplastic resin (COC) | Composite rubber (R-6) | Impact modifier (EPR) | Haze (%) | Izod impact strength (kg · cm/cm²) |
| 15 | 100 | 20 | — | 10 | 30 |
| 16 | 100 | 30 | — | 15 | 40 |
| Com. | | | | | |
| 10 | 100 | — | 20 | (opaque) | 20 |
| 11 | 100 | — | — | 2 | 3 |

From the results in Table 6, it can be shown that the samples obtained in Examples 15 and 16 from the thermoplastic resin compositions of the present invention are excellent in transparency, and as compared with the samples of Comparative Examples 10 and 11, are excellent in impact resistance and have high Izod impact strengths.

EXAMPLE 17

Ten parts of the graft copolymer (S-5) was added to 100 parts of a polycarbonate (L-1250 available from Teijin Kasei Kabushiki Kaisha, hereinafter referred to as "PC") as the thermoplastic resin. The mixture was then extruded and kneaded at a temperature of 260° C. with a biaxial extruder with a vent (32 mm, L/D=25.5) to give pellets.

The obtained pellets were dried at 80° C. for 15 hours and then subjected to injection molding at a temperature of 260°

C. to give a sample plate of 3 mm thick×120 mm×120 mm for evaluation of physical properties.

Izod impact strength of the obtained sample plate was evaluated in the same manner as in Example 14. The results are shown in Table 7.

COMPARATIVE EXAMPLE 12

Pellets were obtained in the same manner as in Example 17 except that 10 parts of FM-21 was used instead of 10 parts of the graft copolymer (S-5), and then a sample plate was produced from the obtained pellets.

Izod impact strength of the obtained sample plate were measured in the same manner as in Example 14. The results are shown in Table 7.

COMPARATIVE EXAMPLE 13

Pellets were obtained in the same manner as in Example 17 except that the graft copolymer (S-5) was not used, and then a sample plate was produced from the obtained pellets.

Izod impact strength of the obtained sample plate was measured in the same manner as in Example 14. The results are shown in Table 7.

TABLE 7

| Ex. No. | Components of thermoplastic resin composition (parts) | | | Physical Properties of sample Izod impact strength (kg · cm/cm$^2$) |
| --- | --- | --- | --- | --- |
| | Thermoplastic resin (PC) | Graft Copolymer (S-5) | Impact modifier (FM-21) | |
| 17 Com. | 100 | 10 | — | 70 |
| 12 | 100 | — | 10 | 50 |
| 13 | 100 | — | — | 8 |

From the results in Table 7, it can be shown that the sample obtained in Example 17 from the thermoplastic resin composition of the present invention is excellent in impact resistance and has a high Izod impact strength as compared with the samples of Comparative Examples 12 and 13.

EXAMPLE 18

Ten parts of the graft copolymer (S-5) was added to 100 parts of a polybutylene terephthalate (Juranex 2002 available from Polyplastics Kabushiki Kaisha, hereinafter referred to as "PBT") as the thermoplastic resin. The mixture was then extruded and kneaded at a temperature of 260° C. with a biaxial extruder with a vent (32 mm, L/D=25.5) to give pellets.

The obtained pellets were dried at 80° C. for 15 hours and then subjected to injection molding at a temperature of 260° C. to give a sample plate of 3 mm thick×120 mm×120 mm for evaluation of physical properties.

Izod impact strength of the obtained sample plate was evaluated in the same manner as in Example 14. The results are shown in Table 8.

COMPARATIVE EXAMPLE 14

Pellets were obtained in the same manner as in Example 18 except that 10 parts of FM-21 was used instead of 10 parts of the graft copolymer (S-5), and then a sample plate was produced from the obtained pellets.

Izod impact strength of the obtained sample plate was measured in the same manner as in Example 14. The results are shown in Table 8.

COMPARATIVE EXAMPLE 15

Pellets were obtained in the same manner as in Example 18 except that the graft copolymer (S-5) was not used, and then a sample plate was produced from the obtained pellets.

Izod impact strength of the obtained sample plate was measured in the same manner as in Example 14. The results are shown in Table 8.

TABLE 8

| Ex. No. | Components of thermoplastic resin composition (parts) | | | Physical Properties of sample Izod impact strength (kg · cm/cm$^2$) |
| --- | --- | --- | --- | --- |
| | Thermoplastic resin (PC) | Graft Copolymer (S-5) | Impact modifier (FM-21) | |
| 18 Com. | 100 | 10 | — | 15 |
| 14 | 100 | — | 10 | 10 |
| 15 | 100 | — | — | 3 |

From the results in Table 8, it can be shown that the sample obtained in Example 18 from the thermoplastic resin composition of the present invention is excellent in impact resistance and has a high Izod impact strength as compared with the samples of Comparative Examples 14 and 15.

The thermoplastic resin composition of the present invention is excellent in moldability and exhibits particularly excellent impact resistance with maintaining inherent properties of the thermoplastic resin such as good transparency, weather resistance and thermal stability.

The thermoplastic resin composition of the present invention can be suitably used for extrusion-molded or calender-molded articles of a sheet, film, plate, article having complicated profiles, etc. which are useful in the fields of packaging, building, civil engineering, automobiles, domestic electric appliances and other miscellaneous goods; articles obtained by blow molding such as bottles; various injection-molded articles used for automobiles and electric appliances; and the like, and thus has very remarkable industrial values.

What we claim is:

1. A thermoplastic resin composition comprising a thermoplastic resin and composite rubber particles and/or a graft copolymer, said composite rubber particles comprising an isobutylene elastomer or oil and vinyl polymer other than the isobutylene elastomer or oil, said composite rubber particles having a structure that the isobutylene elastomer or oil and vinyl polymer are entangled with each other so as not to be separated, said composite rubber particles being in the form of particle having an average particle size of 0.05 to 10 μm and having a gel content not less than 20% by weight, and said graft copolymer is prepared by graft-polymerizing a vinyl monomer to the composite rubber particles, wherein the thermoplastic resin is selected from the group consisting of polyolefin resins, poly(methyl methacrylate), poly(vinyl chloride), polycarbonate, polyester, a mixture of polycarbonate and polyester, polyamide, polystyrene, poly(phenylene ether), a mixture of polystyrene and poly(phenylene ether), polyacetal, polysulfone, polyphenylene sulfide, polyimide, polyether ketone, polyarylate, and homopolymers or copolymers obtained by polymerizing 70 to 100% by weight of at least one of vinyl monomers of aromatic alkenyl compounds, cyanided vinyl compounds and (meth)acrylates with 30 to 0% by weight of other vinyl monomer copolymerizable with at least one of the vinyl monomer and a diene monomer, and the vinyl polymer is selected from the group consisting of acrylates, methacrylates, aromatic alkenyl compounds and cyanided vinyl compounds.

2. The thermoplastic resin composition of claim 1, wherein said composite rubber particles is a mixture of the isobutylene elastomer or oil and vinyl polymer.

3. The thermoplastic resin composition of claim 1, wherein said composite rubber particles comprises 1 to 99% by weight of the isobutylene elastomer or oil and 99 to 1% by weight of the vinyl polymer.

4. The thermoplastic resin composition of claim 1, wherein said composite rubber particles comprises 10 to 90% by weight of the isobutylene elastomer or oil and 90 to 10% by weight of the vinyl polymer.

5. The thermoplastic resin composition of claim 1, wherein said isobutylene elastomer or oil has a moiety derived from a crosslinking agent and/or graft-linking agent.

6. The thermoplastic resin composition of claim 1, wherein said isobutylene polymer comprises a unit derived from isobutylene in an amount of not less than 50% by weight and has a reactive functional group at its molecular end and/or in its molecular chain.

7. The thermoplastic resin composition of claim 1, wherein said isobutylene elastomer or oil has, at its molecular end and/or in its molecular chain, at least one reactive functional group selected from a halogen-containing group, vinyl, allyl, isopropenyl, acryloyl, methacryloyl and a silicon-containing group.

8. The thermoplastic resin composition of claim 1, wherein said isobutylene elastomer or oil has, at its molecular end and/or in its molecular chain, a reactive functional group derived from a diene monomer.

9. The thermoplastic resin composition of claim 1, wherein said isobutylene elastomer or oil has allyl or a silicon-containing group as the reactive functional group at its molecular end and/or in its molecular chain.

10. The thermoplastic resin composition of claim 1, wherein said vinyl polymer has a moiety derived from a crosslinking agent and/or graft-linking agent.

11. The thermoplastic resin composition of claim 10, wherein said vinyl polymer comprises a recurring unit derived from at least one of acrylic acid esters, methacrylic acid esters, aromatic alkenyl compounds and cyanided vinyl compounds.

12. The thermoplastic resin composition of claim 11, wherein said vinyl polymer comprises a recurring unit derived from at least one of acrylic acid esters and aromatic alkenyl compounds.

13. The thermoplastic resin composition of claim 1, wherein said vinyl monomer for grafting is at least one of acrylic acid esters, methacrylic acid esters, aromatic alkenyl compounds and cyanided vinyl compounds.

14. The thermoplastic resin composition of claim 1, wherein said graft copolymer comprises 30 to 95% by weight of the composite rubber and 70 to 5% by weight of the vinyl monomer for grafting.

15. The thermoplastic resin composition of claim 1, wherein said thermoplastic resin is at least one of polymethyl methacrylate, polyvinyl chloride, polyethylene, polypropylene, cyclic polyolefin, polystyrene, polycarbonate, polyester, polyamide, poly(phenylene ether), polyacetal, polysulfone, polyphenylene sulfide, polyimide, polyether ketone and polyarylate.

16. The thermoplastic resin composition of claim 1, wherein said thermoplastic resin is at least one of polymethyl methacrylate, polyvinyl chloride, polyethylene, polypropylene and cyclic polyolefin.

17. A thermoplastic resin composition comprising a thermoplastic resin and composite rubber particles and/or a graft copolymer, said composite rubber particles comprising an isobutylene elastomer or oil, said composite rubber particles having a structure that the isobutylene elastomer or oil and vinyl polymer are entangled with each other so as not to be separated, said composite rubber particles being in the form of particle having an average particle size of 0.05 to 10 $\mu$m and having a gel content not less than 20% by weight, said isobutylene elastomer or oil has a reactive functional group at its molecular end and/or in its molecular chain, said vinyl polymer has a recurring unit derived from an acrylic acid ester and/or aromatic alkenyl compound, and said graft copolymer is prepared by graft-polymerizing a vinyl monomer to the composite rubber particles, wherein the thermoplastic resin is selected from the group consisting of polyolefin resins, poly(methyl methacrylate), poly(vinyl chloride), polycarbonate, polyester, a mixture of polycarbonate and polyester, polyamide, polystyrene, poly(phenylene ether), a mixture of polystyrene and poly(phenylene ether), polyacetal, polysulfone, polyphenylene sulfide, polyimide, polyether ketone, polyarylate, and homopolymers or copolymers obtained by polymerizing 70 to 100% by weight of at least one of vinyl monomers of aromatic alkenyl compounds, cyanided vinyl compounds and (meth)acrylates with 30 to 0% by weight of other vinyl monomer copolymerizable with at least one of the vinyl monomer and a diene monomer.

18. The thermoplastic resin composition of claim 17, wherein said composite rubber particles is a mixture of the isobutylene elastomer or oil and vinyl polymer.

19. The thermoplastic resin composition of claim 17, wherein said thermoplastic resin is at least one of polymethyl methacrylate, polyvinyl chloride, polyethylene, polypropylene, cyclic polyolefin, polycarbonate and polyester.

20. The thermoplastic resin composition of claim 17, wherein said thermoplastic resin is at least one of polymethyl methacrylate, polyvinyl chloride, polyethylene, polypropylene and cyclic polyolefin and a refractive index of the thermoplastic resin is substantially equal to that of at least one of the composite rubber and graft copolymer.

21. A thermoplastic resin composition comprising a thermoplastic resin and composite rubber particles and/or a graft copolymer;

said composite rubber particles comprising an isobutylene elastomer or oil and vinyl polymer other than said isobutylene elastomer or oil, said composite rubber particles having a structure that the isobutylene elastomer or oil and vinyl polymer are entangled with each other so as not to be separated, said composite rubber particles being in the form of particle having an average particle size of 0.05 to 10 μm and having a gel content of not less than 20% by weight, said isobutylene elastomer or oil has a reactive functional group at its molecular end and/or in its molecular chain and a moiety derived from a crosslinking agent an/or graft-linking agent, said vinyl polymer has a recurring unit derived from an acrylic acid ester and/or aromatic alkenyl compound and a moiety derived from a crosslinking agent and/or graft-linking agent, and said graft copolymer is prepared by graft-polymerizing a vinyl monomer to the composite rubber particles, wherein said thermoplastic resin is selected from the group consisting of polyolefin resins, poly(methyl methacrylate), poly(vinyl chloride), polycarbonate, polyester, a mixture of polystyrene and poly(phenylene ether), polyacetal, polysulfone, polyphenylene sulfide, polyimide, polyether ketone, polyarylate, and homopolymers or copolymers obtained by polymerizing 70 to 100% by weight of at least one of vinyl monomers of aromatic alkenyl compounds, cyanided vinyl compounds and (meth)acrylates with 30 to 0% by weight of other vinyl monomer copolymerizable with at least one of the vinyl monomer and a diene monomer.

22. The thermoplastic resin composition of claim 21, wherein said composite rubber particles is a mixture of the isobutylene elastomer or oil and vinyl polymer.

23. The thermoplastic resin composition of claim 21, wherein said thermoplastic resin is at least one of polymethyl methacrylate, polyvinyl chloride, polyethylene, polypropylene, cyclic polyolefin, polycarbonate and polyester.

24. The thermoplastic resin composition of claim 21, wherein said thermoplastic resin is at least one of polymethyl methacrylate, polyvinyl chloride, polyethylene, polypropylene and cyclic polyolefin and a refractive index of the thermoplastic resin is substantially equal to that of at least one of the composite rubber and graft copolymer.

* * * * *